United States Patent
Feder et al.

(10) Patent No.: US 12,464,556 B2
(45) Date of Patent: Nov. 4, 2025

(54) SYSTEMS AND METHODS FOR MULTI-FACTOR TRAFFIC SCHEDULING IN A WIRELESS NETWORK

(71) Applicant: Verizon Patent and Licensing Inc., Basking Ridge, NJ (US)

(72) Inventors: Peretz Feder, Englewood, NJ (US); James Mathew, Belle Mead, NJ (US); Ankur Bharadwaj, New Delhi (IN); Sachin Vargantwar, Cumming, GA (US); Sanjay Charanlal Bisen, Gurgaon (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 463 days.

(21) Appl. No.: 18/055,861

(22) Filed: Nov. 16, 2022

(65) Prior Publication Data
US 2024/0163915 A1   May 16, 2024

(51) Int. Cl.
*H04W 72/566* (2023.01)
*H04W 28/02* (2009.01)

(52) U.S. Cl.
CPC ..... *H04W 72/566* (2023.01); *H04W 28/0268* (2013.01)

(58) Field of Classification Search
USPC ....................................................... 370/235
See application file for complete search history.

(56) References Cited

U.S. PATENT DOCUMENTS

| | | | | |
|---|---|---|---|---|
| 11,570,127 | B1 * | 1/2023 | Matthews | H04L 47/28 |
| 2017/0325124 | A1 * | 11/2017 | Mitra | H04L 47/41 |
| 2021/0120033 | A1 * | 4/2021 | Gorrepati | H04W 12/106 |
| 2021/0204160 | A1 * | 7/2021 | Jo | H04W 28/0263 |
| 2022/0166725 | A1 * | 5/2022 | Su | H04L 47/783 |
| 2023/0239737 | A1 * | 7/2023 | Lou | H04L 69/166 370/229 |
| 2025/0023964 | A1 * | 1/2025 | Fu | H04L 65/80 |

(Continued)

OTHER PUBLICATIONS

Third Generation Partnership Project, "Technical Specification Group Services and System Aspects; System Architecture for the 5G System (5GS); Stage 2 (Release 17)," TS 23.501 V17.6.0 (Sep. 2022).

(Continued)

*Primary Examiner* — Chuong T Ho

(57) ABSTRACT

A device described herein, such as a User Plane Function ("UPF") of a core network or some other network element, may receive traffic associated with a first User Equipment ("UE") and a second UE. The traffic may include a first set of packets associated with the first UE and a second set of packets associated with the second UE. The first and second packets may be received in a first sequence. The device may generate a second sequence by re-sequencing the received traffic based on Quality of Service ("QoS") parameters associated with the traffic, such as 5G QoS Identifier ("5QI") values. The device may generate a third sequence by re-sequencing the second sequence based on parameters associated with at least the first UE or the second UE. The device may output at least a portion of the received traffic in accordance with the third sequence.

20 Claims, 13 Drawing Sheets

(56) References Cited

U.S. PATENT DOCUMENTS

2025/0039740 A1\* 1/2025 Fu .............................. H04L 1/18
2025/0097761 A1\* 3/2025 Fu ..................... H04W 28/0268

OTHER PUBLICATIONS

Data Plane Development Kit, "Quality of Service (QoS) Framework," Programmer's Guide Section 51, available at https://doc.dpdk.org/guides/prog_guide/qos_framework.html (visited Nov. 2, 2022).

\* cited by examiner

Sequence 201 (traffic 105-1 and 105-2 in actual sequence as received by UPF 107)

Re-sequence traffic based on time of arrival and 5QI

Sequence 205 (based on time of arrival and 5QI)

Sequence 501 based on 5QI-weighted sequences per UE and UE priorities

←—Time——

Sequence 401 based on 5QI-weighted sequences per UE

←—Time——

Sequence 205 based on 5QI and time of arrival

←—Time——

Original sequence 201 of traffic received by UPF 107

←—Time——

Sequence 601-1
for UE_1 after re-sequencing

Sequence 105-1 (as received)

Sequence 601-2
for UE_2 after re-sequencing

Sequence 105-2 (as received)

US 12,464,556 B2

SYSTEMS AND METHODS FOR MULTI-FACTOR TRAFFIC SCHEDULING IN A WIRELESS NETWORK

BACKGROUND

Wireless networks may provide services to User Equipment ("UEs") such as mobile phones, tablets, Internet of Things ("IoT") devices, automated guided vehicles ("AGVs"), and/or other types of devices with wireless communication capability. The services may include, for example, routing traffic to or from UEs in accordance with Quality of Service ("QoS") parameters, Service Level Agreements ("SLAs"), or the like, in order to deliver at least a threshold measure of performance with respect to the traffic. Elements of the wireless network (e.g., a User Plane Function ("UPF"), a router, etc.) may, for example, schedule traffic based on such QoS parameters, SLAs, etc.

DETAILED DESCRIPTION OF EXAMPLE EMBODIMENTS

The following detailed description refers to the accompanying drawings. The same reference numbers in different drawings may identify the same or similar elements.

Networks, such as wireless networks, may provide traffic routing services or other services in order to meet QoS parameters, SLAs, performance thresholds, etc. associated with traffic sent to or from UEs that are communicatively coupled to the networks. In order to meet the QoS parameters, SLAs, etc., the networks may perform scheduling, queueing, prioritizing, etc. of traffic (e.g., user plane traffic) sent to or from UEs, which may include altering a sequence of traffic. For example, altering the sequence of traffic may include outputting or forwarding traffic associated with a particular UE in a different sequence than such traffic was received, relative to traffic associated with other UEs. In accordance with some embodiments, such scheduling, queuing, etc. may be performed in a manner that is based on multiple factors, such as a QoS indicator associated with traffic (e.g., a 5G QoS Identifier ("5QI") value, an Allocation and Retention Priority ("ARP") value, a QoS Flow Identifier ("QFI") associated with a given traffic flow (e.g., which may be associated with a respective 5QI value or other suitable QoS parameter), a QoS Class Identifier ("QCI") value (e.g., a Fourth Generation ("4G") QCI value), etc. that is included in traffic header information, is associated with a given traffic flow, and/or is otherwise associated with the traffic), attributes of a UE associated with the traffic (e.g., a device type, a UE category or classification, etc.), and/or other factors. The scheduling of traffic based on multiple factors, in accordance with embodiments described herein, may provide more granular control over how QoS parameters or SLAs may be provided in a network.

Figure 1:
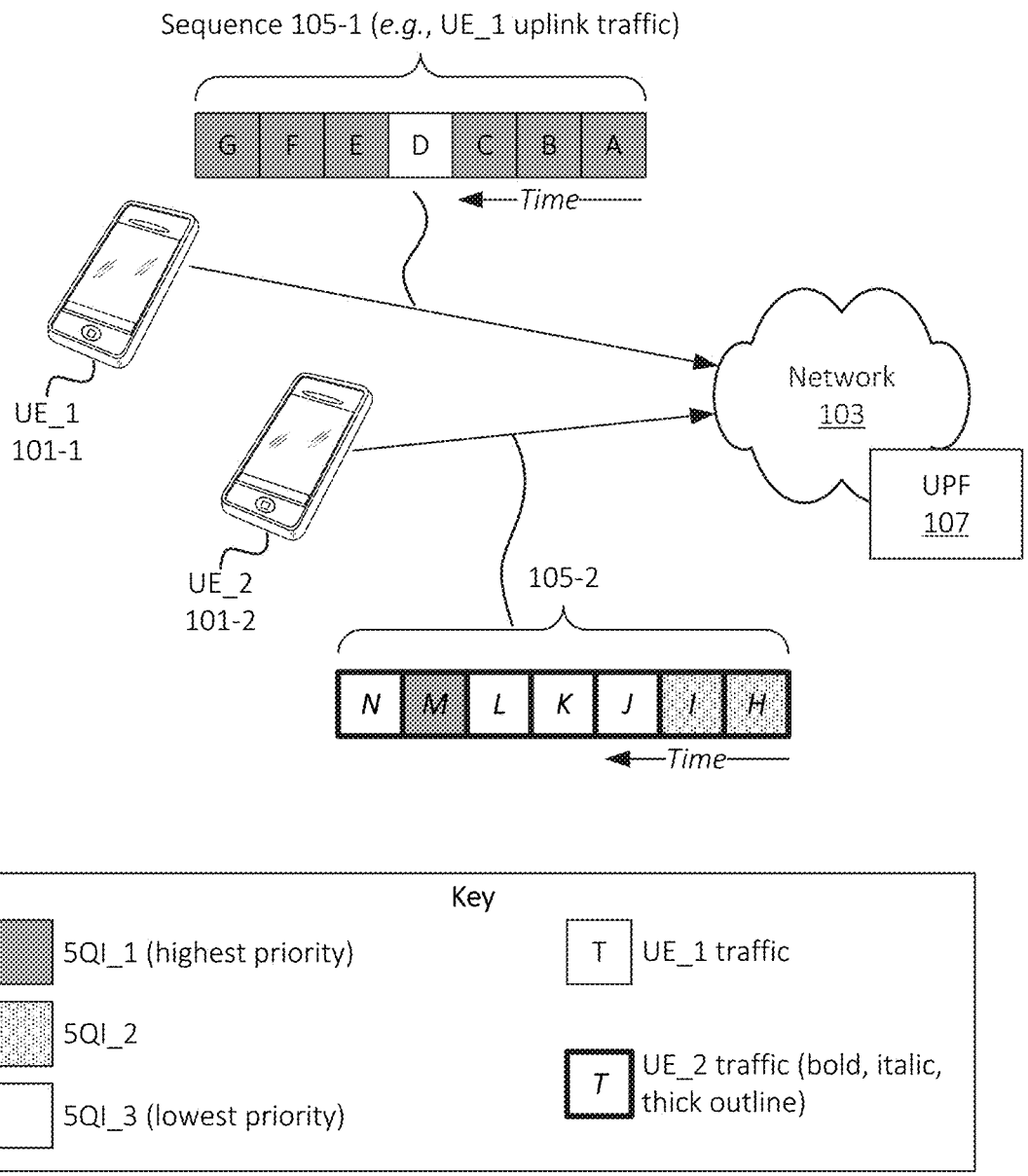
FIG. 1 illustrates an example of a network receiving traffic associated with a set of UEs.

As shown in FIG. 1, a set of UEs 101 (e.g., including UEs 101-1 and 101-2) may be communicatively coupled to a particular network 103. Although the examples herein are discussed in the context of two UEs 101-1 and 101-2, similar concepts may apply to scenarios in which traffic associated with multiple (e.g., hundreds, thousands, or more) UEs is received, processed, sequenced, etc. Network 103 may be, may include, may be communicatively coupled to, and/or may otherwise be associated with a RAN (e.g., a Long-Term Evolution ("LTE") RAN, a Fifth Generation ("5G") RAN, and/or some other type of RAN) that provides wireless connectivity between UEs 101 and a core network (e.g., an Evolved Packet Core ("EPC"), a 5G core ("5GC"), etc.) and/or some other type of network. UEs 101 may communicate, via network 103, with one or more external networks (e.g., the Internet), other UEs 101, application servers, etc. Examples described herein are presented in the context of uplink traffic (e.g., as outputted by UEs 101 via network 103). Similar concepts may apply in the context of downlink traffic (e.g., traffic sent to UEs 101 via network 103).

Uplink traffic associated with UEs 101 may include and/or may otherwise be represented by a set of packets that are sent over time via network 103. For example, sequence 105-1 may include a set of packets, represented in the figures as packets A-G (e.g., packets "A," "B," "C," etc.). Sequence 105-1 may be sent in a particular sequence, order, etc. (referred to herein simply as a "sequence"), such as sequence 105-1. In the examples described herein, sequence 105-1 may be a sequence in which packet A is outputted by UE 101-1 first, packet B is outputted second, packet C is outputted third, and so on. Similarly traffic outputted by UE 101-2 in accordance with examples described herein (e.g., sequence 105-2) may include packets H—N, where packet H is outputted first, packet I is outputted second, and so on.

The traffic outputted by UEs 101-1 and 101-2 may be associated with particular QoS parameters, SLAs, QoS flows, etc. For example, header information associated with particular packets may include a 5QI value, respective packets may be associated with a particular QoS flow or protocol data unit ("PDU") session, and/or may otherwise be associated with different QoS parameters. In some embodiments, the header information associated with particular packets may include a session identifier (e.g., a PDU session identifier), a flow identifier (e.g., a QFI value), and/or other identifier of a communication session with which the particular packets are associated. In some embodiments, such communication sessions (e.g., PDU sessions, flows associated with respective QFI values, etc.) may be associated with a particular set of QoS parameters, such as a particular 5QI value or other suitable value. In the examples described herein, the different QoS parameters are referred to in the context of 5QI values. In practice, similar concepts may apply to different types of QoS parameters, identifiers, values, etc.

For example, packets A-C and D-G, outputted by UE 101-1, may be associated with a first 5QI value "5QI 1," which may be associated with a highest priority in the examples discussed herein. Additionally, packet D, outputted by UE 101-1, may be associated with a third 5QI value "5QI 3," which may be associated with a lowest priority in the examples discussed herein. Sequence 105-1 may be based on an order in which UE 101-1 outputted packets A-G, which may include a first-in-first-out methodology (e.g., an application executing at UE 101-1 may have requested that packet A be outputted, and then requested that packet B be outputted, etc.). As another example, UE 101-1 may implement a scheduling technique in which UE 101-1 has prioritized, re-sequenced, scheduled, etc. packets A-G in the particular sequence 105-1. For example, a first application executing at UE 101-1 may have requested the output of packet D prior to a second application requesting the output of packets A-C, and UE 101-1 may have scheduled or prioritized packets A-C ahead of packet D based on 5QI, UE Route Selection Policy ("URSP") rules, or other suitable factors. Similarly, packet M associated with UE 101-2 may be associated with the highest priority (e.g., 5QI_1), packets H and I may be associated with a second priority (e.g., 5QI_2), and packets J-L and N may be associated with the lowest priority (e.g., 5QI_3).

Figure 2A:
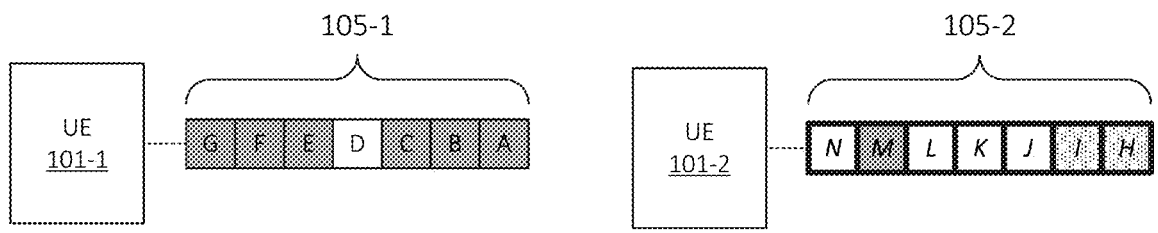
FIGS. 2A and 2B illustrate an example of re-sequencing the received traffic based on QoS parameters associated with the traffic, in accordance with some embodiments.
Figure 2A:
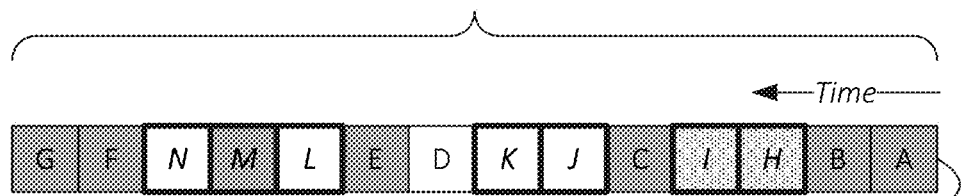
Figure 2A:
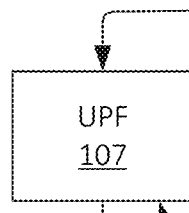
Figure 2A:
Figure 2A:
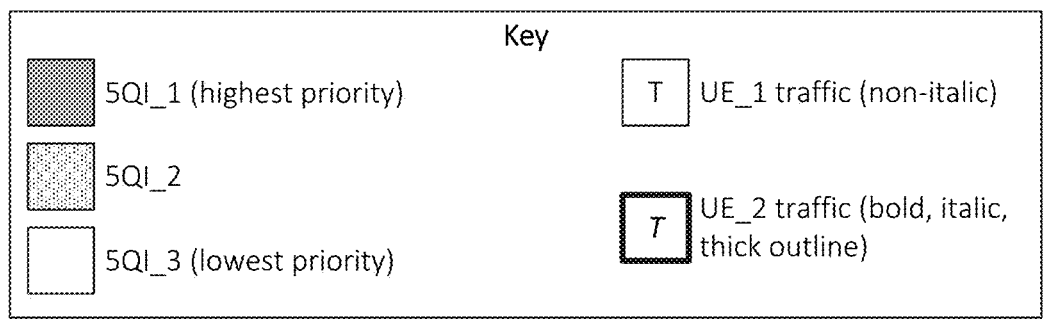

As discussed below, in accordance with one or more embodiments, one or more elements of network 103 (e.g., UPF 107, a Packet Data Network ("PDN") Gateway ("PGW"), a router, and/or other suitable network elements) may schedule, prioritize, etc. the received traffic associated with UEs 101-1 and 101-2 based on respective 5QI values associated with respective packets as well as one or more other factors. For example, as shown in FIG. 2A, sequence 201 represents a sequence in which one or more elements of network 103 (e.g., UPF 107) receive the combined uplink traffic of UEs 101-1 and 101-2. For example, UPF 107 may receive packet A, then packet B, then packet H, then packet I, and so on. While discussed herein as a "flat" sequence, sequence 201 may represent a sequence in which multiple packets are received simultaneously, within the same time slot, etc.

Figure 2B:
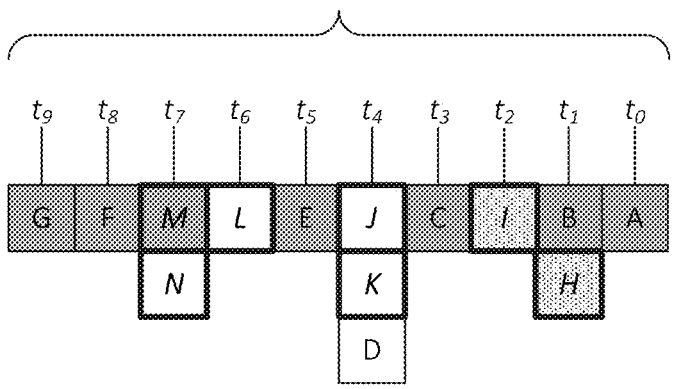
Figure 2B:
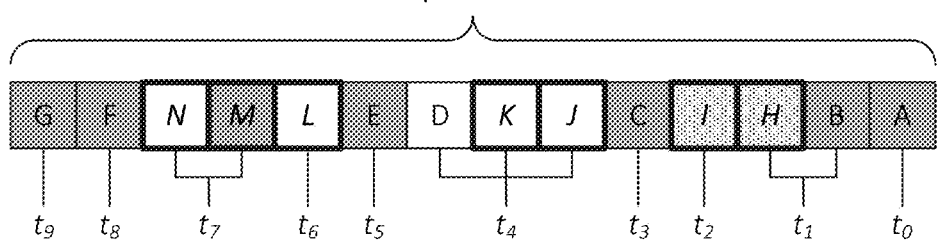

For example, as shown in FIG. 2B, packets B and H, associated with UEs 101-1 and 101-2 respectively, may be received at the same time (e.g., at time $t_1$, within time slot $t_1$, etc.). Additionally, packet D (associated with UE 101-1) and packets J and K, associated with UE 101-2, may be received at the same time (e.g., at time $t_4$, within time slot $t_4$, etc.). Further, packets M and N (e.g., associated with UE 101-2) may be received at the same time (e.g., at time $t_7$, within time slot $t_7$, etc.). For the sake of simplicity, the example sequences described herein are "flat" sequences, but similar concepts may apply to sequences in which multiple packets are sent or received simultaneously (e.g., at the same time, within the same time slot, etc.). For example, sequences 201 and 203 may, in some scenarios, be different representations of the same sequence or order of packets as received from UEs 101-1 and 101-2, and/or may represent a scenario in which the packets are actually received from UEs 101-1 and 101-2 in the depicted order.

Figure 2C:
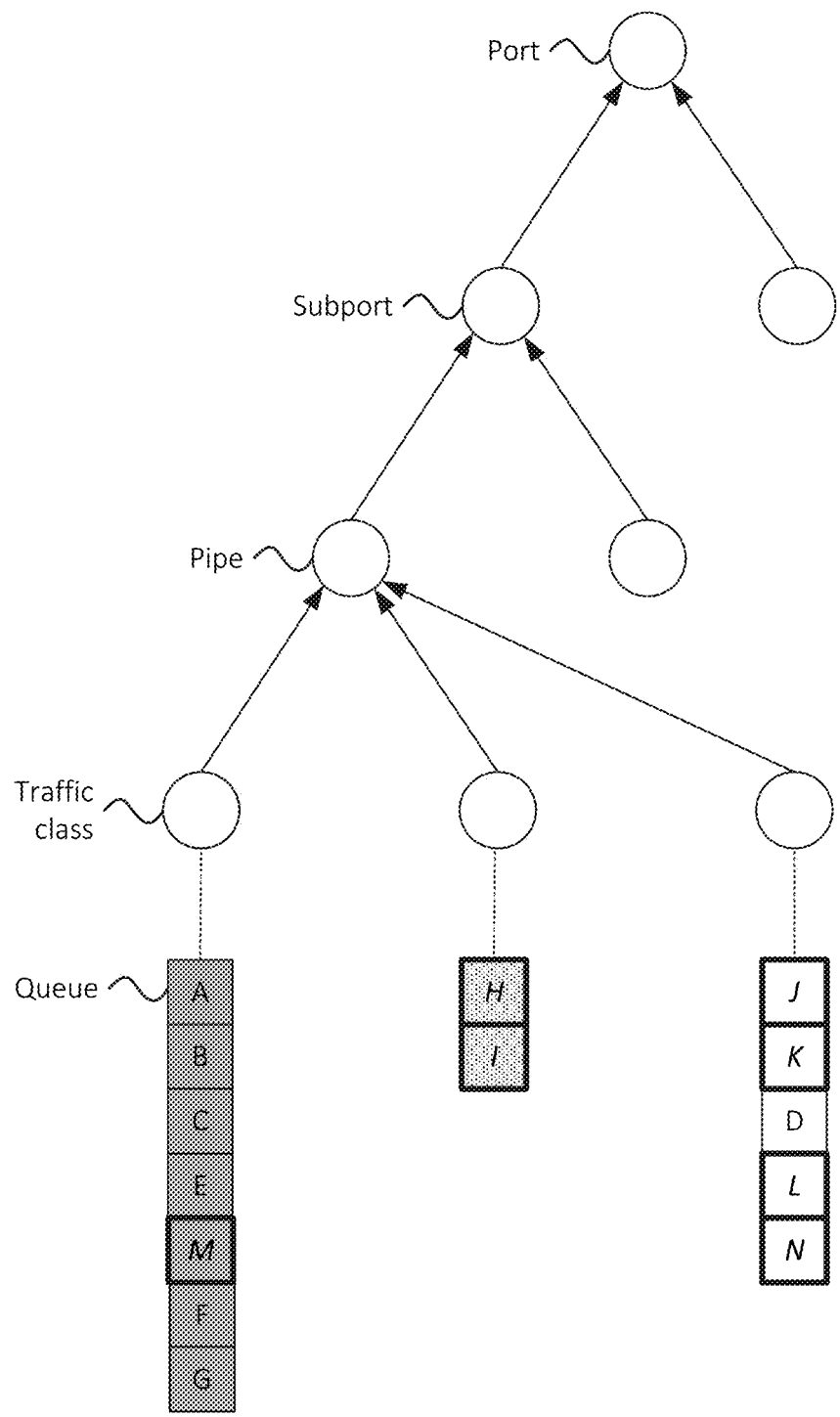
FIG. 2C illustrates an example queueing technique in which multiple buffers or queues may be associated with different respective traffic flows.

Returning to FIG. 2A, UPF 107 may, in accordance with some embodiments, re-sequence the traffic received from UEs 101-1 and 101-2. For example, UPF 107 may generate sequence 205 based on sequence 201. UPF 107 may utilize any suitable scheduling or queuing technique, algorithm, methodology, etc. when re-sequencing sequence 201 to generate sequence 205. For example, UPF 107 may utilize a Data Plane Development Kit ("DPDK") QoS framework of a multiple queue technique, a weighted fair queuing ("WFQ") technique (e.g., a QoS-based WFQ technique), and/or other type of technique to generate sequence 205. In some embodiments, UPF 107 may utilize multiple queues, buffers, etc. to generate sequence 205 based on sequence 201. For example, UPF 107 may utilize one ingress buffer or queue for 5QI_1 traffic, another ingress buffer or queue for 5QI_2 traffic, and so on. Similarly, while depicted as a "flat" sequence of packets, sequence 205 may be implemented by UPF 107 via multiple output buffers or queues (e.g., output buffers or queues that are each associated with a respective 5QI value). For example, as shown in FIG. 2C, one queue may be used for one traffic class or priority level (e.g., a particular 5QI value), another queue may be used for another traffic class or priority level, and so on. In some embodiments, multiple queues each associated with one set of traffic classes or priority levels may be associated with a particular pipe. In some embodiments, multiple pipes may be associated with a particular subport. In some embodiments, multiple subports may be associated with a particular port.

As similarly discussed above, the "flat" sequence 205 may also represent time slots in which multiple packets may be outputted, such as an implementation in which packets A and B are outputted on a first time slot, packets C and H are outputted on a third time slot, packets E and M are outputted on a fourth time slot, and so on. The re-sequencing of traffic, as performed by UPF 107, may be based on a time of arrival of respective packets and/or 5QI values associated with such packets. For example, although packet C was received by UPF 107 after receiving packet H (and/or is otherwise later or lower in sequence 201 than packet H), UPF 107 may place packet C ahead of packet H in sequence 205 based on the higher 5QI value associated with packet C. Similarly, packets J, K, D, L, and N may be placed relatively lower in sequence 205 than in sequence 201 based on being associated with the lowest priority 5QI value (i.e., 5QI_3, in these examples).

Figure 3:
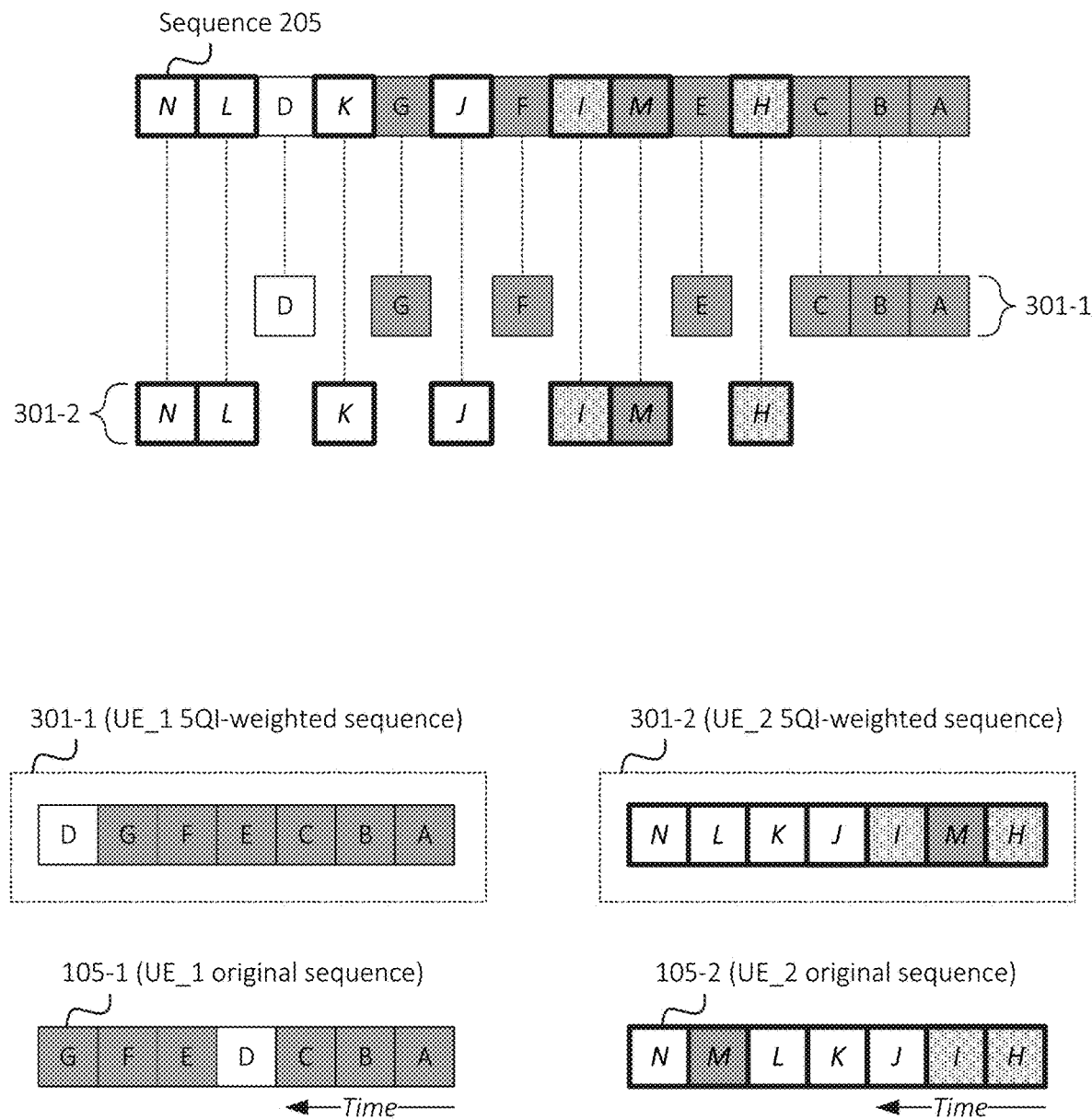
FIGS. 3-5 illustrate examples of further re-sequencing the traffic based on UE parameters, in accordance with some embodiments.

In accordance with some embodiments, UPF 107 may further re-sequence the traffic received from UEs 101-1 and 101-2. For example, UPF 107 may re-sequence sequence 205 in order to generate another sequence (e.g., sequence 401, sequence 501, and/or some other sequence, as discussed below) based on one or more factors in addition to 5QI values. In some embodiments, the other factors may include a "round-robin" methodology in which packets associated with UEs 101-1 and 101-2 are scheduled equally, a UE priority methodology in which packets associated with a particular UE 101 are weighted more heavily than packets associated with other UEs 101, and/or other factors. As shown in FIG. 3, in order to perform the further re-sequencing, UPF 107 may generate or identify 5QI-weighted sequences 301-1 and 301-2, associated with UEs 101-1 and 101-2, respectively. For example, UPF 107 may identify which particular UE 101 is associated with each packet in sequence 205, and may generate 5QI-weighted sequences 301 based on the identification of which UE 101 is associated with such packets.

As shown, for instance, UPF 107 may identify that the first three packets in sequence 205 (i.e., packets A-C) are associated with UE 101-1, and thus are associated with 5QI-weighted sequence 301-1. UPF 107 may identify that the fourth packet in sequence 205 (i.e., packet H) is associated with UE 101-2, and is thus associated with 5QI-weighted sequence 301-2. UPF 107 may identify that the fifth packet in sequence 205 (i.e., packet E) is UE 101-1, and is thus associated with 5QI-weighted sequence 301-1. UPF 107 may similarly identify which UE 101 is associated with some or all of the remainder of the packets in sequence 205, and may place such packets in 5QI-weighted sequences 301-1 or 301-2 accordingly.

As such, 5QI-weighted sequences 301 may be different from sequences 105, which are the sequences of packets as originally outputted from UEs 101. For example, while sequence 105-1 includes packet D in a fourth position of the sequence, 5QI-weighted sequence 301-1 may include packet D in a seventh position of the sequence. Similarly, 5QI-weighted sequence 301-2, associated with UE 101-2, may be different (e.g., in a different sequence, order, etc.) from sequence 105-2.

Figure 4:
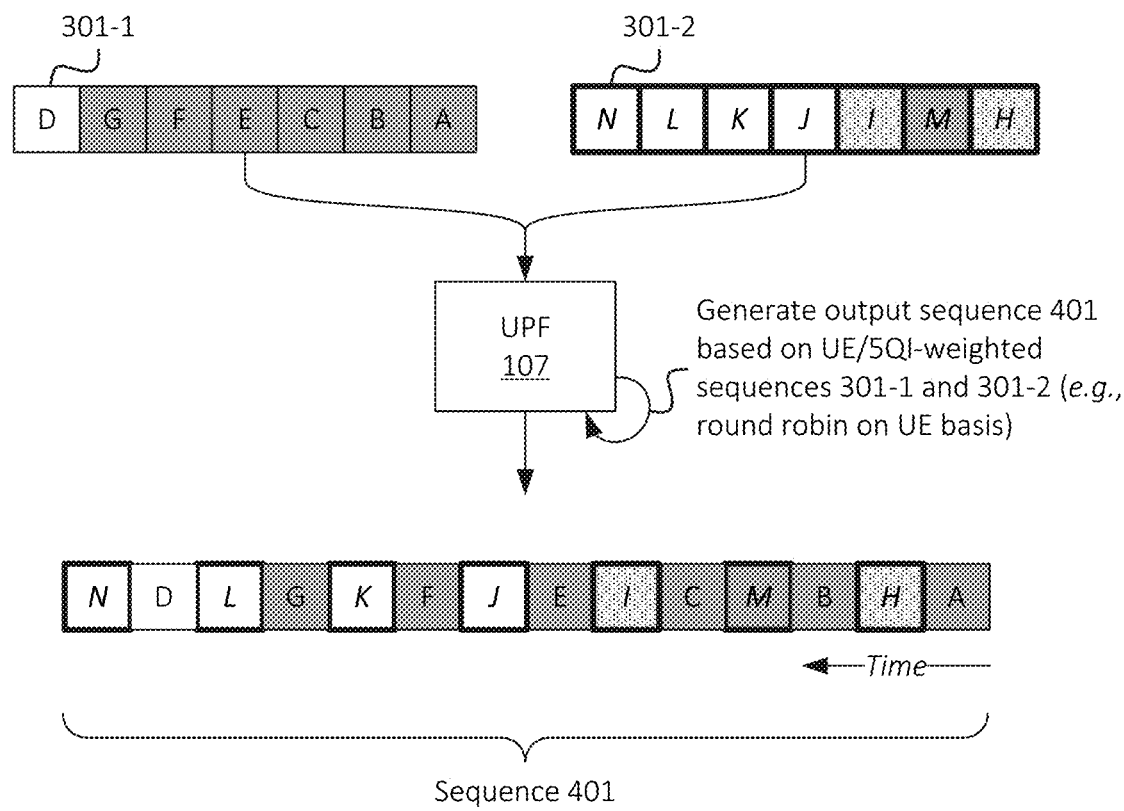

As noted above, and as shown in FIG. 4, UPF 107 may re-sequence sequence 205 (e.g., based on identifying 5QI-weighted sequences 301-1 and 301-2) in order to generate sequence 401. In the example of FIG. 4, UPF 107 may utilize a round-robin approach, in which UPF 107 alternates between selecting from 5QI-weighted sequence 301-1 and 5QI-weighted sequence 301-2 when generating sequence 401. For example, the first, third, fifth, seventh, etc. positions of sequence 401 may be selected from 5QI-weighted sequence 301-1 (e.g., associated with UE 101-1), and the second, fourth, sixth, eight, etc. positions of sequence 401 may be selected from 5QI-weighted sequence 301-2 (e.g., associated with UE 101-2). In some embodiments, the sequences indicated in 5QI-weighted sequences 301-1 and 301-2 may be maintained when generating sequence 401. For example, since 5QI-weighted sequence 301-1 indicates that packet A is higher, earlier, etc. in the sequence than packet B, and that packet B is higher in the sequence than packet C, sequence 401 may also indicate that packet A is higher in the sequence than packet B, and that packet B is higher in the sequence than packet C, and so on. Similarly, packet H may be higher than packet M in sequence 401 based on being higher than packet M in 5QI-weighted sequence 301-2, and so on.

In this manner, the particular sequence of the received traffic from UEs 101-1 and 101-2 as determined based on 5QI values (e.g., sequence 205) may be maintained, but the further re-sequencing of traffic based on the respective UEs 101 with which the traffic is associated may serve to eliminate or mitigate scenarios in which a particular UE 101 may experience excessive packet loss or delays when traffic for such UE 101 may be of a relatively lower priority than traffic associated with other UEs 101.

Figure 5:
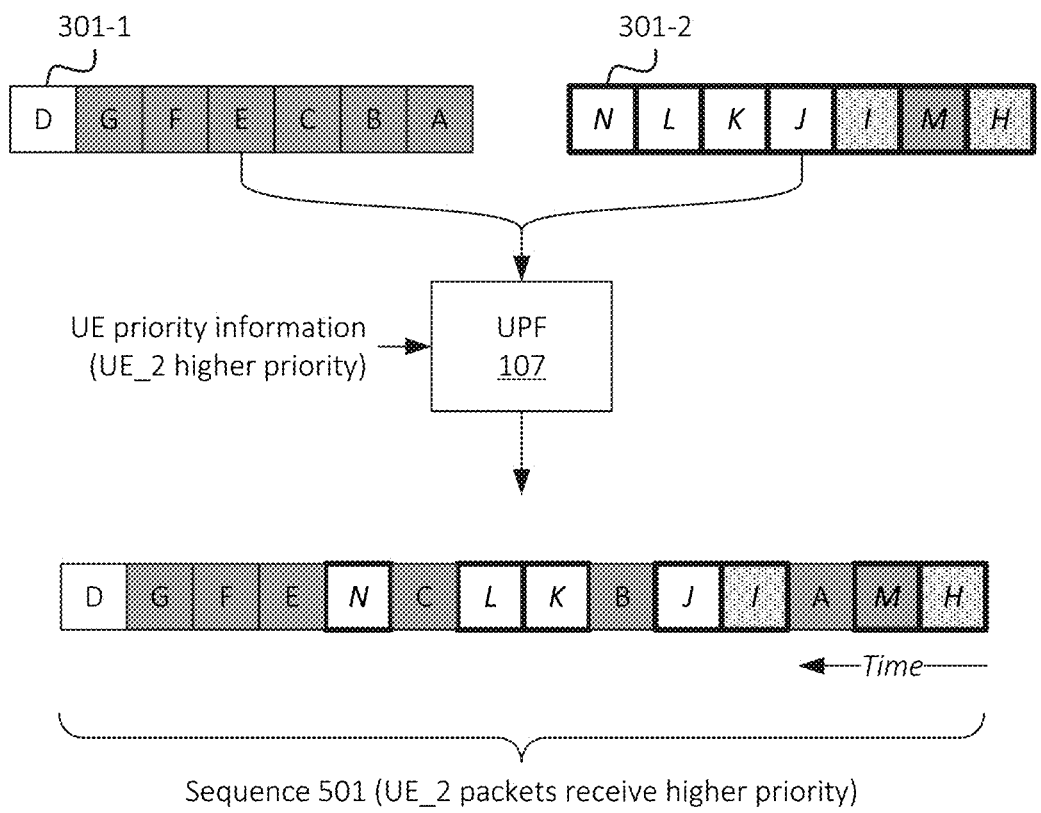

In some embodiments, as noted above, UPF 107 may utilize one or more other factors or methodologies when further re-sequencing sequence 205. For example, as shown in FIG. 5, UPF 107 may receive UE priority information and/or other suitable information based on which UPF 107 may re-sequence sequence 205 (e.g., based on 5QI-weighted sequences 301-1 and 301-2). For example, UPF 107 may receive such information directly or indirectly from a Unified Data Management function ("UDM"), a Home Subscriber Server ("HSS"), a Policy Control Function ("PCF"), a Policy Charging and Rules Function ("PCRF"), a Network Exposure Function ("NEF"), a Service Capability Exposure Function ("SCEF"), or other suitable device or system. The priority information may indicate, for example, a priority level associated with one or more UEs 101 (e.g., based on a UE identifier, such as an International Mobile Station Equipment Identity ("IMEI"), an International Mobile Subscriber Identity ("IMSI"), a Mobile Directory Number ("MDN"), an Internet Protocol ("IP") address, etc.), groups of UEs 101, UE device types (e.g., mobile phone, IoT device, AGV, etc.), category or label (e.g., enterprise, first responder, ultra-low latency, etc.), and/or other suitable UE attributes.

In this example, assume that the priority information indicates that UE 101-2 is associated with a higher priority level than UE 101-1 (i.e., UE 101-1 is associated with a lower priority level than UE 101-2). In such embodiments, UPF 107 may determine that, based on the higher priority of UE 101-2, re-sequencing sequence 205 to generate sequence 501 may include providing, applying, etc. greater weight to traffic associated with UE 101-2 than to traffic associated with UE 101-1. In some embodiments, and as shown in FIG. 5, the greater weight may be implemented as placing two packets from 5QI-weighted sequence 301-2 (e.g., associated with UE 101-2) for every one packet placed from 5QI-weighted sequence 301-1 into sequence 501. As such, Sequence 501 may include packets H and M associated with UE 101-2, then packet A associated with UE 101-1, then packets I and J associated with UE 101-2, and so on. In this manner, the sequence based on 5QI values (e.g., sequence 205) as well as the relative priorities of UEs 101-1 and 101-2 may be preserved when generating sequence 501. Further, the QoS and user experience of UE 101-1 (e.g., the lower priority UE) may still receive consideration when sequence 501 is generated, thereby avoiding or mitigating scenarios in which excessive traffic is dropped or delayed for UE 101-1.

While examples of re-sequencing sequence 205 (e.g., to generate sequences 401 and 501) are described above, in practice, other methodologies or factors may be used to re-sequence sequence 205. In some embodiments, when re-sequencing sequence 205 (e.g., to generate sequences 401 and 501), UPF 107 may verify that sequences 401 and 501 satisfy QoS parameters, SLAs, etc. associated with 5QI values or other suitable parameters associated with the re-sequenced traffic. For example, while sequence 501 shows packet G (e.g., associated with the highest priority level 5QI_1) relatively late in the sequence, UPF 107 may have verified that placing packet G at such position does not violate QoS parameters, SLAs, Key Performance Indicators ("KPIs"), etc. associated with the priority level of packet G.

In some embodiments, UPF 107 may refrain from performing re-sequencing on some traffic. For example, UPF 107 may identify a particular 5QI value, or other suitable attribute, of traffic that is associated with guaranteed bitrate ("GBR") traffic, and may place such traffic at the front of, or ahead of, re-sequenced traffic (e.g., sequences 401 or 501). For example, in a scenario where UPF 107 receives traffic from UEs 101 with 5QI values ranging from 5QI_0 to 5QI_3 (e.g., where 5QI_0 is an even higher priority level than 5QI_1), the examples provided herein may apply to the traffic associated with 5QI_1 through 5QI_3, while the traffic associated with 5QI_0 may be placed ahead of, or at the front of, the re-sequenced traffic (e.g., ahead of, or at the front of sequences 401 or 501).

Figure 6A:
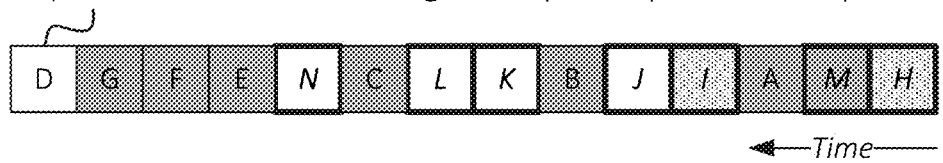
FIGS. 6A and 6B illustrate examples of different outcomes of different sequencing or scheduling techniques.
Figure 6A:
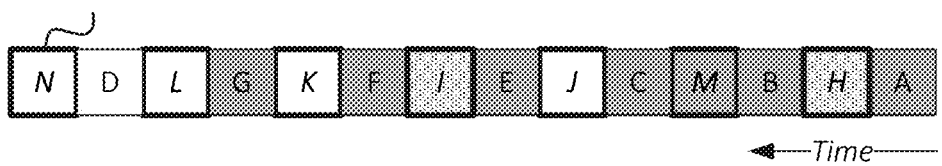
Figure 6A:
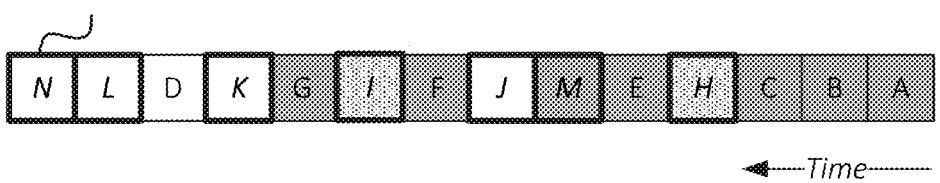
Figure 6A:
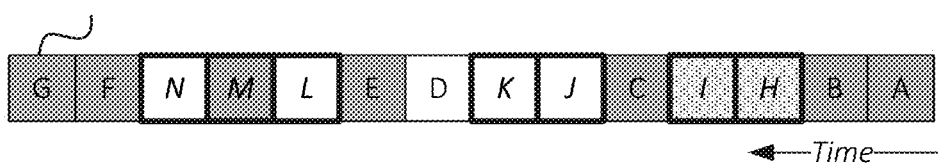

As noted above, the re-sequencing of traffic may provide for more granular control of QoS treatment of traffic in network 103, including the ability to fine tune scheduling based on fairness to all UEs 101, priority levels of respective UEs 101, and/or other suitable factors. FIG. 6A illustrates an example of the different outcomes of different sequencing or scheduling techniques, as well as a comparison between such techniques and the original sequence 201 as received by UPF 107. For example, sequence 205, which is based on a re-sequencing by UPF 107 based on 5QI values and/or time of arrival or receipt by UPF 107, may be relatively "front loaded" with packets associated with UE 101-1 (e.g., packets A, B, C, and E are four of the first five packets of the sequence).

Sequence 401, generated based on a round-robin approach, distributes packets associated with each UE 101 more evenly, which may provide for a more consistent user experience across different UEs 101. Further, in situations where UE 101-2 has a higher priority than UE 101-1, the result of sequencing the traffic based on 5QI values and without regard to UE priority (e.g., sequence 205) may result in a situation where a lower priority UE (i.e., UE 101-1, in this example) receives more preferential QoS treatment (e.g., the "front loading" discussed above) than the higher priority UE. In accordance with some embodiments, sequence 501, which is generated based on UE priorities, may distribute packets more heavily for UE 101-2, which may be more commensurate with the higher relative priority of UE 101-2 as compared to UE 101-1.

Figure 6B:
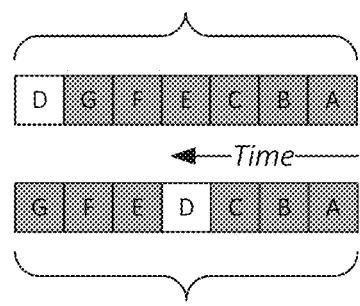
Figure 6B:
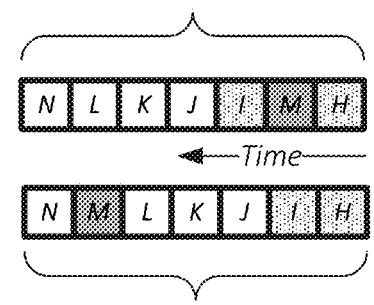

As noted above, although sequences 401 and 501 are shown as "flat" sequences, such sequences may be implemented in any suitable manner. For example, as shown in FIG. 6B, sequences 401 and/or 501 may represent, and/or may be used as inputs to generate one or more additional sequences or queues. For example, sequence 601-1 may represent a sequence or queue associated with UE 101-1, and sequence 601-2 may represent a sequence or queue associated with UE 101-2. For example, sequence 601-1 may include packets in the sequence A, B, C, E, F, G, and D, which may be different from the original sequence 105-1 in which such packets were received from UE 101-1. Similarly, sequence 601-2 may be a different sequence than sequence 105-2 in which such packets were received were received from UE 101-2. Sequences 601-1 and 601-1 may be, for example, derived from sequences 401 and/or 501, as sequences 401 and 501 may include the same sequence of packets, on a per-UE basis, as sequences 601-1 and/or 601-2.

Figure 7:
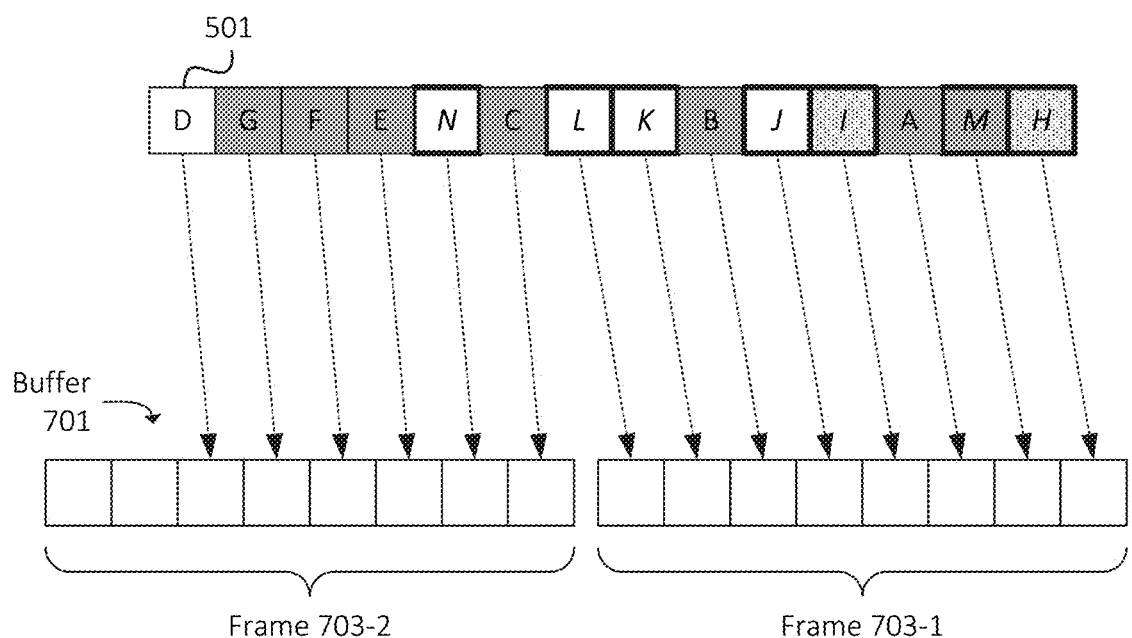
FIGS. 7 and 8 illustrate respective example implementations of outputting or dropping traffic based on the further re-sequencing of traffic based on UE parameters, in accordance with some embodiments.
Figure 8:
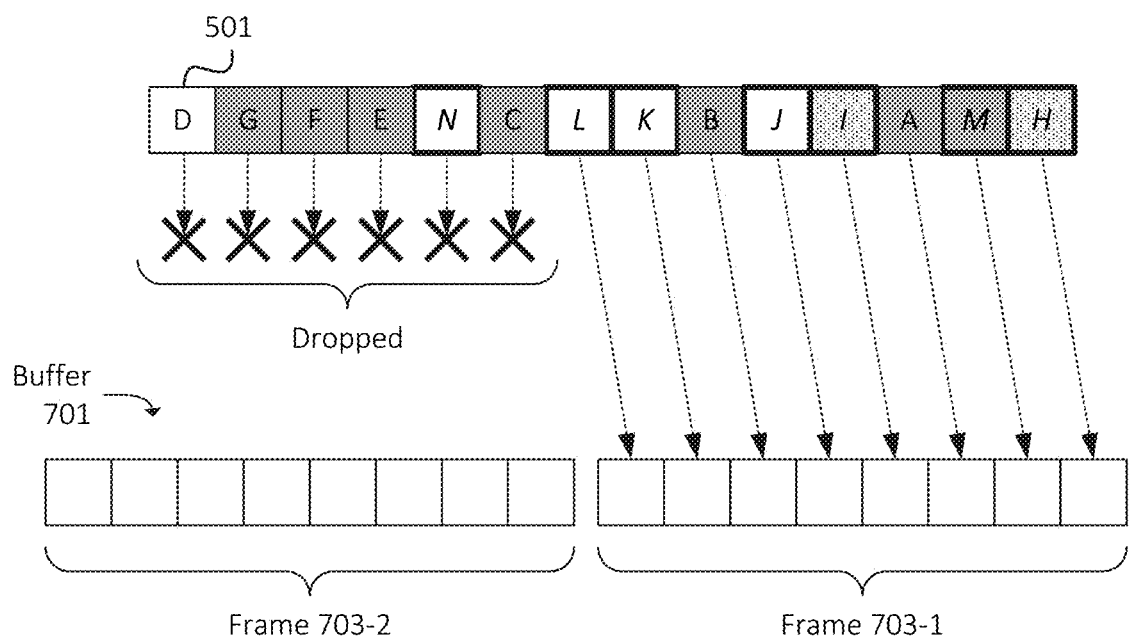

For example, as shown in FIGS. 7 and 8, UPF 107 may implement an output buffer 701 via which multiple packets may be outputted on a given time frame 703. In these examples, UPF 107 may be capable of outputting eight packets per time frame 703, and buffer 701 may accordingly include eight slots per time frame.

In the example of FIG. 7, assuming that UPF 107 has performed a further re-sequencing of sequence 205 to generate sequence 501 (e.g., based on UE priorities), UPF 107 may place the first eight packets of sequence 501 (i.e., packets H, M, A, I, J, B, K, and L) into buffer 701 for a first time frame 703-1, and may place the remaining packets (i.e., packets C, N, E, F, G, and D) into buffer 701 for a second time frame 703-2.

In some embodiments, UPF 701 may implement a methodology in which packets in excess of the per-frame output capacity are dropped. For example, as shown in FIG. 8, the packets of sequence 501 may be candidates for outputting at time frame 703-1, and UPF 107 may select only the first eight packets for placement in buffer 701 for time frame 703-1. As such, the remaining packets (i.e., packets H, M, A, I, J, B, K, and L) may be dropped (e.g., UPF 107 may forgo outputting these packets, and as such these packets may not be outputted or forwarded by UPF 107), as UPF 107 may be configured to evaluate another set of packets for placement into buffer 701 for time frame 703-2. In some embodiments, as noted above, UPF 107 may verify that scheduling such for a later time frame 703 or dropping packets or (e.g., as shown in FIGS. 7 and 8) does not violate QoS parameters, SLAs, KPIs, etc. associated with such packets.

Figure 9:
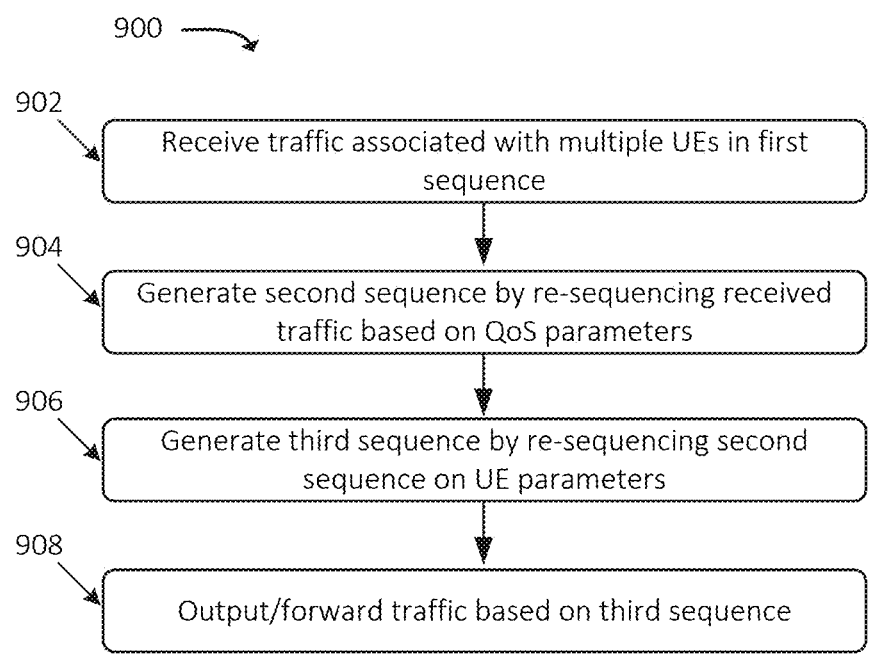
FIG. 9 illustrates an example process for multi-factor scheduling or sequencing of traffic based on QoS parameters and UE parameters, in accordance with some embodiments.

FIG. 9 illustrates an example process 900 for multi-factor scheduling, re-sequencing, etc. traffic based on QoS parameters and one or more other factors, such as UE parameters. In some embodiments, some or all of process 900 may be performed by UPF 107. In some embodiments, one or more other devices may perform some or all of process 900 in concert with, and/or in lieu of, UPF 107.

As shown, process 900 may include receiving (at 902) traffic associated with multiple UEs 101 in a first sequence (e.g., system-wide traffic). For example, as discussed above, UPF 107 may receive traffic from UEs 101-1 and 101-2 in sequence 201, which may be based on respective sequences 105-1 and 105-2 in which UEs 101-1 and 101-2 outputted the traffic.

Process 900 may further include generating (at 904) a second sequence by re-sequencing the received traffic based on QoS parameters associated with the traffic. As discussed above, the traffic may include header information or other information based on which UPF 107 may be able to identify QoS parameters, such as 5QI values or other suitable values. UPF 107 may re-sequence the received traffic (e.g., may re-sequence sequence 201, reorder sequence 201, modify sequence 201, etc.) to generate sequence 205. For example, UPF 107 may place higher priority packets, of the received traffic, higher in sequence 205 than lower priority packets. In some embodiments, generating sequence 205 may include re-sequencing the received traffic based on both time of arrival (and/or some other temporal aspect) as well as QoS parameters.

Process 900 may additionally include generating (at 906) a third sequence by further re-sequencing the traffic (e.g., by re-sequencing the second sequence) based on UE parameters. For example, as discussed above, UPF 107 may re-sequence the traffic based on an identifier of which particular UE 101 each packet is associated. For example, UPF 107 may perform a round-robin placement of packets associated with each UE 101 in sequence 401, and/or may otherwise distribute packets in sequence 401 based on with which UE 101 each packet is associated. Additionally, or alternatively, UPF 107 may identify priority levels associated with each UE 101, and may distribute packets in sequence 501 based on such priority levels (e.g., sequence 501 may be "front loaded" with packets from a UE 101 with a higher priority level, and/or sequence 501 may otherwise prioritize packets associated with the higher priority UE 101).

Process 900 may also include outputting and/or forwarding (at 908) at least a portion of the traffic based on the third sequence. For example, as discussed above, UPF 107 may generate one or more output queues or buffers 701 based on the further re-sequencing (e.g., based on sequence 401, sequence 501, or some other suitable sequence based on the re-sequencing of sequence 205, as discussed above). UPF 107 may accordingly output or forward the traffic (e.g., downlink traffic to UEs 101, and/or uplink traffic from UEs 101 to their respective destinations) based on the output queues or buffers 701. As discussed above, generating the output queues or buffers 701 may include dropping packets, scheduling packets for particular time frames 703, and/or other suitable scheduling or queuing operations.

Figure 10:
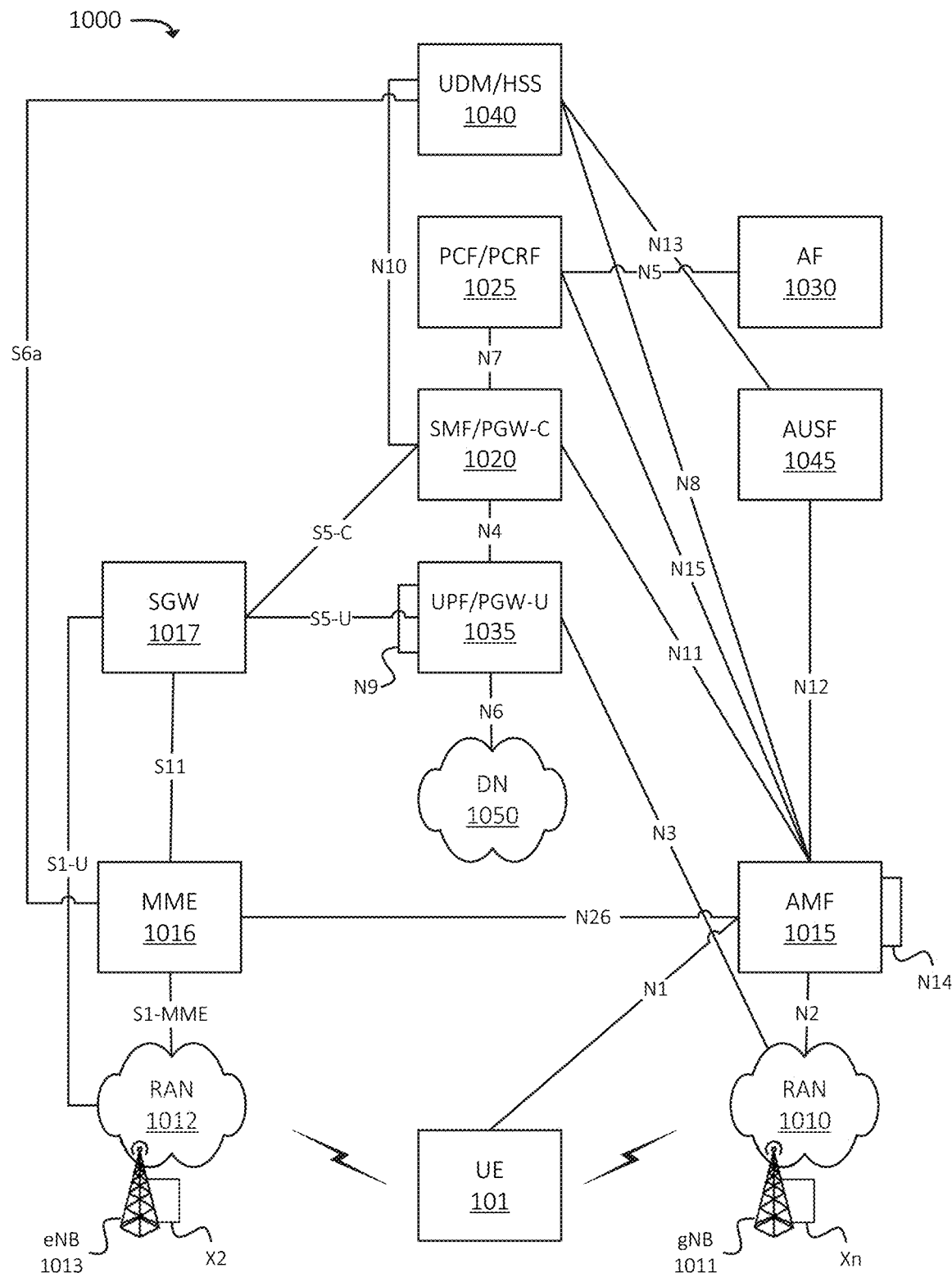
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a 5G network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an EPC). In some embodiments, portions of environment 1000 may represent or may include a 5GC. As shown, environment 1000 may include UE 101, RAN 1010 (which may include one or more Next Generation Node Bs ("gNBs") 1011), RAN 1012 (which may include one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/PGW-Control plane function ("PGW-C") 1020, PCF/PCRF 1025, Application Function ("AF") 1030, UPF/PGW-User plane function ("PGW-U") 1035, UDM/HSS 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050).

The example shown in FIG. 10 illustrates one instance of each network component or function (e.g., one instance of SMF/PGW-C 1020, PCF/PCRF 1025, UPF/PGW-U 1035, UDM/HSS 1040, and/or AUSF 1045). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF/PGW-C 1020, PCF/PCRF 1025, UPF/PGW-U 1035, UDM/HSS 1040, and/or AUSF 1045, while another slice may include a second instance of SMF/PGW-C 1020, PCF/PCRF 1025, UPF/PGW-U 1035, UDM/HSS 1040, and/or AUSF 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000. In some embodiments, environment 1000 may be, may include, may be implemented by, and/or may be communicatively coupled to network 103.

UE 101 may include a computation and communication device, such as a wireless mobile communication device that is capable of communicating with RAN 1010, RAN 1012, and/or DN 1050. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 101 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 101 may communicate with one or more other elements of environment 1000. UE 101 may communicate with RAN 1010 via an air interface (e.g., as provided by gNB 1011). For instance, RAN 1010 may receive traffic (e.g., user plane traffic such as voice call traffic, data traffic, messaging traffic, etc.) from UE 101 via the air interface, and may communicate the traffic to UPF/PGW-U 1035 and/or one or more other devices or networks. Further, RAN 1010 may receive signaling traffic, control plane traffic, etc. from UE 101 via the air interface, and may communicate such signaling traffic, control plane traffic, etc. to AMF 1015 and/or one or more other devices or networks. Additionally, RAN 1010 may receive traffic intended for UE 101 (e.g., from UPF/PGW-U 1035, AMF 1015, and/or one or more other devices or networks) and may communicate the traffic to UE 101 via the air interface.

RAN 1012 may be, or may include, a LTE RAN that includes one or more base stations (e.g., one or more eNBs 1013), via which UE 101 may communicate with one or more other elements of environment 1000. UE 101 may communicate with RAN 1012 via an air interface (e.g., as provided by eNB 1013). For instance, RAN 1012 may receive traffic (e.g., user plane traffic such as voice call traffic, data traffic, messaging traffic, signaling traffic, etc.) from UE 101 via the air interface, and may communicate the traffic to UPF/PGW-U 1035 (e.g., via SGW 1017) and/or one or more other devices or networks. Further, RAN 1012 may receive signaling traffic, control plane traffic, etc. from UE 101 via the air interface, and may communicate such signaling traffic, control plane traffic, etc. to MME 1016 and/or one or more other devices or networks. Additionally, RAN 1012 may receive traffic intended for UE 101 (e.g., from UPF/PGW-U 1035, MME 1016, SGW 1017, and/or one or more other devices or networks) and may communicate the traffic to UE 101 via the air interface.

AMF 1015 may include one or more devices, systems, Virtualized Network Functions ("VNFs"), Cloud-Native Network Functions ("CNF s"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1012 and/or eNBs 1013, and/or to perform other operations.

SGW 1017 may include one or more devices, systems, VNFs, CNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, CNFs, etc., that gather, process, store, and/or provide information in a manner described herein. SMF/PGW-C 1020 may, for example, facilitate the establishment of communication sessions on behalf of UE 101. In some embodiments, the establishment of communications sessions may be performed in accordance with one or more policies provided by PCF/PCRF 1025.

PCF/PCRF 1025 may include one or more devices, systems, VNFs, CNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, CNFs, etc., that receive, store, and/or provide information that may be used in determining parameters (e.g., quality of service parameters, charging parameters, or the like) for certain applications.

UPF/PGW-U 1035 may include one or more devices, systems, VNFs, CNFs, etc., that receive, store, and/or provide data (e.g., user plane data). For example, UPF/PGW-U 1035 may receive user plane data (e.g., voice call traffic, data traffic, etc.), destined for UE 101, from DN 1050, and may forward the user plane data toward UE 101 (e.g., via RAN 1010, SMF/PGW-C 1020, and/or one or more other devices). In some embodiments, multiple UPFs 1035 may be deployed (e.g., in different geographical locations), and the delivery of content to UE 101 may be coordinated via the N9 interface (e.g., as denoted in FIG. 10 by the line marked "N9" originating and terminating at UPF/PGW-U 1035). Similarly, UPF/PGW-U 1035 may receive traffic from UE 101 (e.g., via RAN 1010, RAN 1012, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035. In some embodiments, UPF/PGW-U 1035 may include, may implement, may be implemented by, and/or may otherwise be associated with UPF 107.

UDM/HSS 1040 and AUSF 1045 may include one or more devices, systems, VNFs, CNFs, etc., that manage, update, and/or store, in one or more memory devices associated with AUSF 1045 and/or UDM/HSS 1040, profile information associated with a subscriber. AUSF 1045 and/or UDM/HSS 1040 may perform authentication, authorization, and/or accounting operations associated with the subscriber and/or a communication session with UE 101.

DN 1050 may include one or more wired and/or wireless networks. For example, DN 1050 may include an IP-based PDN, a wide area network ("WAN") such as the Internet, a private enterprise network, and/or one or more other networks. UE 101 may communicate, through DN 1050, with data servers, other UEs 101, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 101 may communicate.

Figure 11:
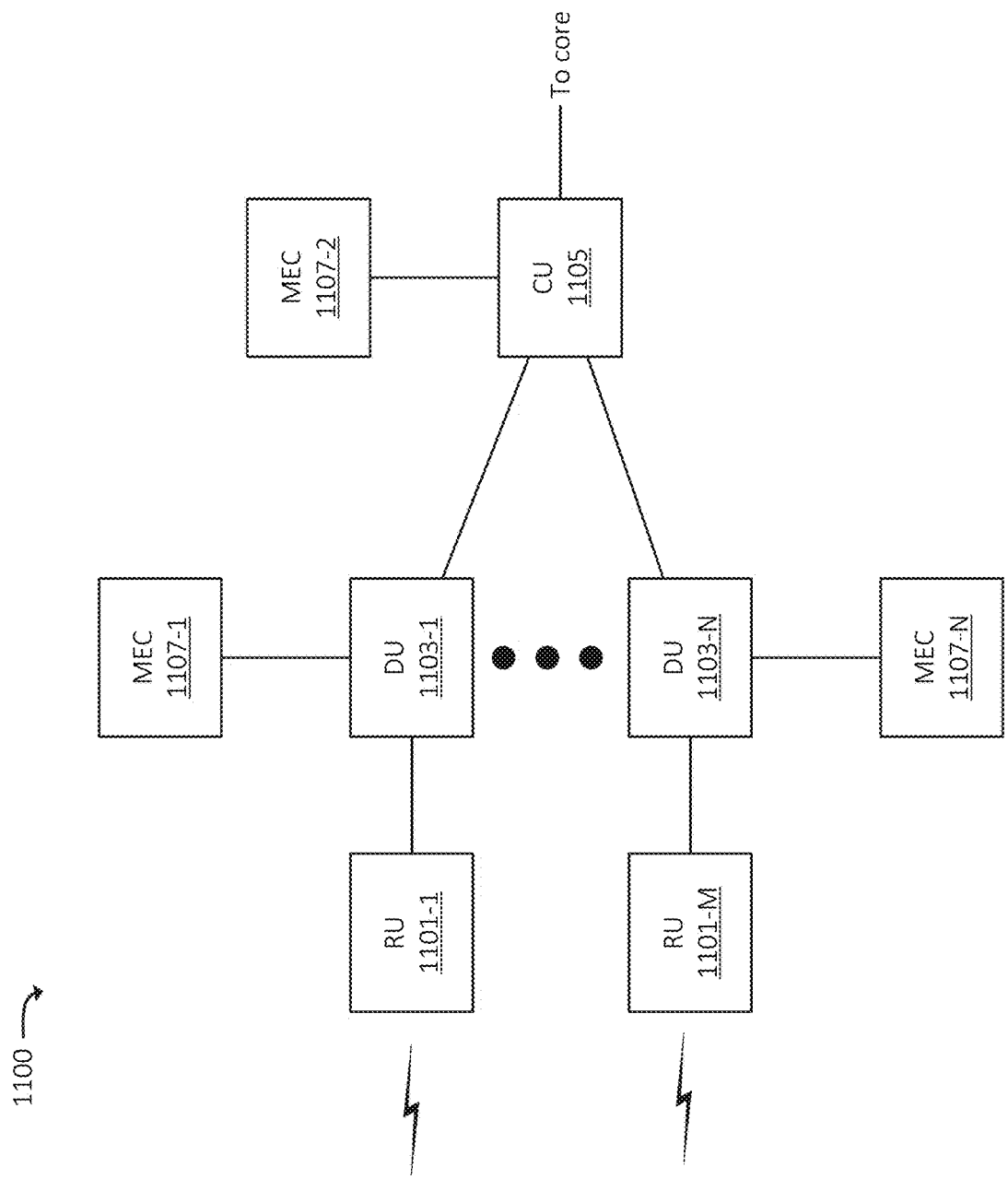
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 1010, RAN 1012, or some other RAN). In some embodiments, a particular RAN may include one RAN environment 1100. In some embodiments, a particular RAN may include multiple RAN environments 1100. In some embodiments, RAN environment 1100 may correspond to a particular gNB 1011 of a 5G RAN (e.g., RAN 1010). In some embodiments, RAN environment 1100 may correspond to multiple gNBs 1011. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 101 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 101, and may determine which DU(s) 1103 should receive the downlink traffic. DU 1103 may include one or more devices that transmit traffic between a core network (e.g., via CU 1105) and UE 101 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 101.

RU 1101 may include hardware circuitry (e.g., one or more RF transceivers, antennas, radios, and/or other suitable hardware) to communicate wirelessly (e.g., via an RF interface) with one or more UEs 101, one or more other DUs 1103 (e.g., via RUs 1101 associated with DUs 1103), and/or any other suitable type of device. In the uplink direction, RU 1101 may receive traffic from UE 101 and/or another DU 1103 via the RF interface and may provide the traffic to DU 1103. In the downlink direction, RU 1101 may receive traffic from DU 1103, and may provide the traffic to UE 101 and/or another DU 1103.

One or more elements of RAN environment 1100 may, in some embodiments, be communicatively coupled to one or more Multi-Access/Mobile Edge Computing ("MEC") devices, referred to sometimes herein simply as "MECs" 1107. For example, DU 1103-1 may be communicatively coupled to MEC 1107-1, DU 1103-N may be communicatively coupled to MEC 1107-N, CU 1105 may be communicatively coupled to MEC 1107-2, and so on. MECs 1107 may include hardware resources (e.g., configurable or provisionable hardware resources) that may be configured to provide services and/or otherwise process traffic to and/or from UE 101, via a respective RU 1101.

For example, DU 1103-1 may route some traffic, from UE 101, to MEC 1107-1 instead of to a core network via CU 1105. MEC 1107-1 may process the traffic, perform one or more computations based on the received traffic, and may provide traffic to UE 101 via RU 1101-1. In some embodiments, MEC 1107 may include, and/or may implement, some or all of the functionality described above with respect to AF 1030, UPF 107, and/or one or more other devices, systems, VNFs, CNFs, etc. In this manner, ultra-low latency services may be provided to UE 101, as traffic does not need to traverse DU 1103, CU 1105, links between DU 1103 and CU 1105, and an intervening backhaul network between RAN environment 1100 and the core network.

Figure 12:
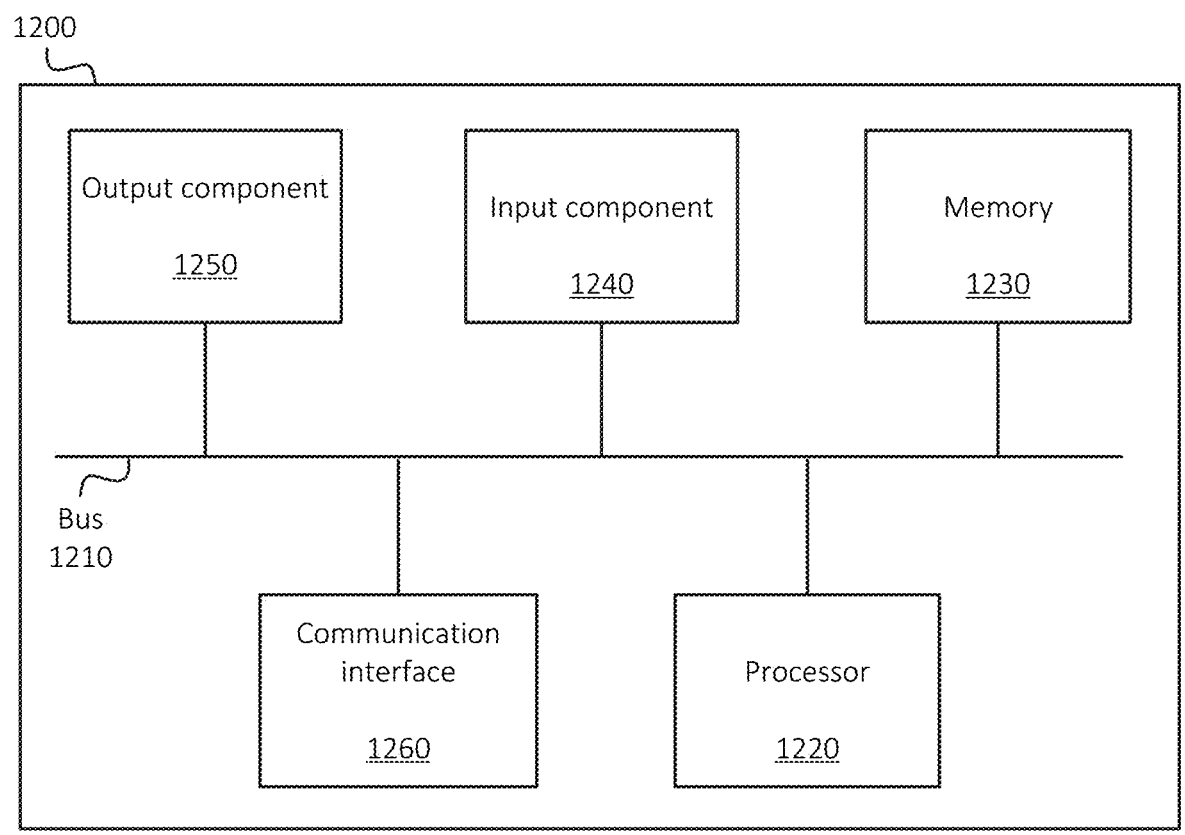
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   receive traffic associated with a first User Equipment ("UE") and a second UE, wherein the traffic includes a first set of packets associated with the first UE and a second set of packets associated with the second UE, wherein the first and second packets are received in a first sequence;
   generate a second sequence by re-sequencing the received traffic based on Quality of Service ("QoS") parameters associated with the traffic;
   generate a third sequence by re-sequencing the second sequence based on parameters associated with at least the first UE or the second UE,
   wherein generating the third sequence includes dropping one or more packets, wherein outputting the portion of the received traffic includes forgoing outputting the dropped one or more packets; and
   output at least a portion of the received traffic in accordance with the third sequence.

2. The device of claim 1, wherein the QOS parameters include priority levels associated with each packet of the first and second sets of packets.

3. The device of claim 2, wherein the priority levels are each associated with a respective 5G QOS Identifier ("5QI").

4. The device of claim 1, wherein the receiving, generating, and outputting are performed by a User Plane Function ("UPF") of a wireless network.

5. The device of claim 1, wherein generating the third sequence includes placing a plurality of packets, from the second sequence, in the third sequence based on with which respective UE, of the first and second UEs, each respective packet, of the plurality of packets, is associated.

6. The device of claim 1, wherein the receiving, generating, and outputting are performed by a User Plane Function ("UPF") of a wireless network.

7. A device, comprising:
   one or more processors configured to:
   receive traffic associated with a first User Equipment ("UE") and a second UE, wherein the traffic includes a first set of packets associated with the first UE and a second set of packets associated with the second UE, wherein the first and second packets are received in a first sequence;
   generate a second sequence by re-sequencing the received traffic based on Quality of Service ("QoS") parameters associated with the traffic;
   generate a third sequence by re-sequencing the second sequence based on parameters associated with at least the first UE or the second UE,
   wherein generating the third sequence includes placing each packet, from the second sequence, in the third sequence based on relative priority levels of the first and second UEs with which each packet is associated; and
   output at least a portion of the received traffic in accordance with the third sequence.

8. A non-transitory computer-readable medium, storing a plurality of processor-executable instructions to:
   receive traffic associated with a first User Equipment ("UE") and a second UE, wherein the traffic includes a first set of packets associated with the first UE and a second set of packets associated with the second UE, wherein the first and second packets are received in a first sequence;
   generate a second sequence by re-sequencing the received traffic based on Quality of Service ("QoS") parameters associated with the traffic;
   generate a third sequence by re-sequencing the second sequence based on parameters associated with at least the first UE or the second UE,
   wherein generating the third sequence includes dropping one or more packets, wherein outputting the portion of the received traffic includes forgoing outputting the dropped one or more packets; and
   output at least a portion of the received traffic in accordance with the third sequence.

9. The non-transitory computer-readable medium of claim 8, wherein the QoS parameters include priority levels associated with each packet of the first and second sets of packets.

10. The non-transitory computer-readable medium of claim 9, wherein the priority levels are each associated with a respective 5G QOS Identifier ("5QI").

11. The non-transitory computer-readable medium of claim 8, wherein the receiving, generating, and outputting are performed by a User Plane Function ("UPF") of a wireless network.

12. The non-transitory computer-readable medium of claim 8, wherein generating the third sequence further includes placing a plurality of packets, from the second sequence, in the third sequence based on with which respective UE, of the first and second UEs, each respective packet, of the plurality of packets, is associated.

13. The non-transitory computer-readable medium of claim 12, wherein generating the third sequence further includes placing the plurality of packets, from the second sequence, in the third sequence based on relative priority levels of the first and second UEs with which each respective packet, of the plurality of packets, is associated.

14. A method, comprising:
    receiving traffic associated with a first User Equipment ("UE") and a second UE, wherein the traffic includes a first set of packets associated with the first UE and a second set of packets associated with the second UE, wherein the first and second packets are received in a first sequence;
    generating a second sequence by re-sequencing the received traffic based on Quality of Service ("QoS") parameters associated with the traffic;
    generating a third sequence by re-sequencing the second sequence based on parameters associated with at least the first UE or the second UE,
        wherein generating the third sequence includes dropping one or more packets, wherein outputting the portion of the received traffic includes forgoing outputting the dropped one or more packets; and
    outputting at least a portion of the received traffic in accordance with the third sequence.

15. The method of claim 14, wherein the QoS parameters include 5G QOS Identifier ("5QI") values associated with each packet of the first and second sets of packets.

16. The method of claim 4, wherein the receiving, generating, and outputting are performed by a User Plane Function ("UPF") of a wireless network.

17. The method of claim 14, wherein generating the third sequence further includes placing a plurality of packets, from the second sequence, in the third sequence based on with which respective UE, of the first and second UEs, each respective packet, of the plurality of packets, is associated.

18. A method, comprising:
    receiving traffic associated with a first User Equipment ("UE") and a second UE, wherein the traffic includes a first set of packets associated with the first UE and a second set of packets associated with the second UE, wherein the first and second packets are received in a first sequence;
    generating a second sequence by re-sequencing the received traffic based on Quality of Service ("QoS") parameters associated with the traffic;
    generating a third sequence by re-sequencing the second sequence based on parameters associated with at least the first UE or the second UE,
        wherein generating the third sequence includes placing each packet, from the second sequence, in the third sequence based on relative priority levels of the first and second UEs with which each packet is associated; and
    outputting at least a portion of the received traffic in accordance with the third sequence.

19. The method of claim 18, wherein the receiving, generating, and outputting are performed by a User Plane Function ("UPF") of a wireless network.

20. The method of claim 18, wherein the QOS parameters include 5G QOS Identifier ("5QI") values associated with each packet of the first and second sets of packets.

\* \* \* \* \*